Oct. 16, 1951      G. TOMPKINS      2,571,791

PROCESS CONTROL APPARATUS

Filed July 31, 1947

INVENTOR.
George Tompkins.
BY Darby & Darby
Att'ys.

Patented Oct. 16, 1951

2,571,791

UNITED STATES PATENT OFFICE 2,571,791

PROCESS CONTROL APPARATUS

George Tompkins, Wollaston, Mass.

Application July 31, 1947, Serial No. 764,940

5 Claims. (Cl. 175—183)

This invention relates to apparatus for controlling batch heat processes in which the control and/or indication if desired is subject to variations in the electrical resistance of the heated batch.

In the heat processing of many batch materials it is possible to determine the progress of the heat treatment of the batch at intermediate as well as the final stage of processing by variation in the resistance of the batch. The purpose of this invention is to provide an exceedingly simple and yet satisfactory, accurate apparatus functioning in proportion to the changes in resistance of the batch during processing, for the purpose of signaling and/or controlling the processing thereof.

For example in rendering plants the parts of the animal from which fertilizer, poultry feed and the like ultimately may be made are batch processed for the purpose of extracting the oils, minerals, vitamins and other valuable contents thereof. These animal parts are rendered by heat treatment in batches comprising indiscriminate mixtures of the non-edible organs and other parts of the animal for which there is no other use. It has been demonstrated by experience, however, that as a mixture of these parts is heat processed for the extraction of the valuable constituents thereof, there is a sufficiently uniform and reliable change in the resistance of the batch which is a wet mixture of these ground animal parts which can be taken as a variable factor indicative of the progress of the processing thereof.

It is common practice to process the batch in steam heated kettles while stirring it with power driven stirrers. At the beginning of the treatment the electrical resistance of the batch is of low order. As the cooking progresses the resistance increases, very slowly at first, then more and more rapidly as the batch becomes nearly dry. The change in resistance follows a reasonably uniform curve. Certain values of resistance, at which the processing attains optimum values and maximum yields have been determined by experience. Therefore a properly designed resistance measuring circuit is suitable for giving indications of the conditions of the batch, and particularly an indication of the end point of treatment of the batch and when desirable provide a control factor by means of which the processing can be interrupted.

The general object of this invention is to provide apparatus for accomplishing this object.

This invention resides substantially in the combination, construction, arrangement and relative location of parts, all as will be described in detail below.

Figure 1:
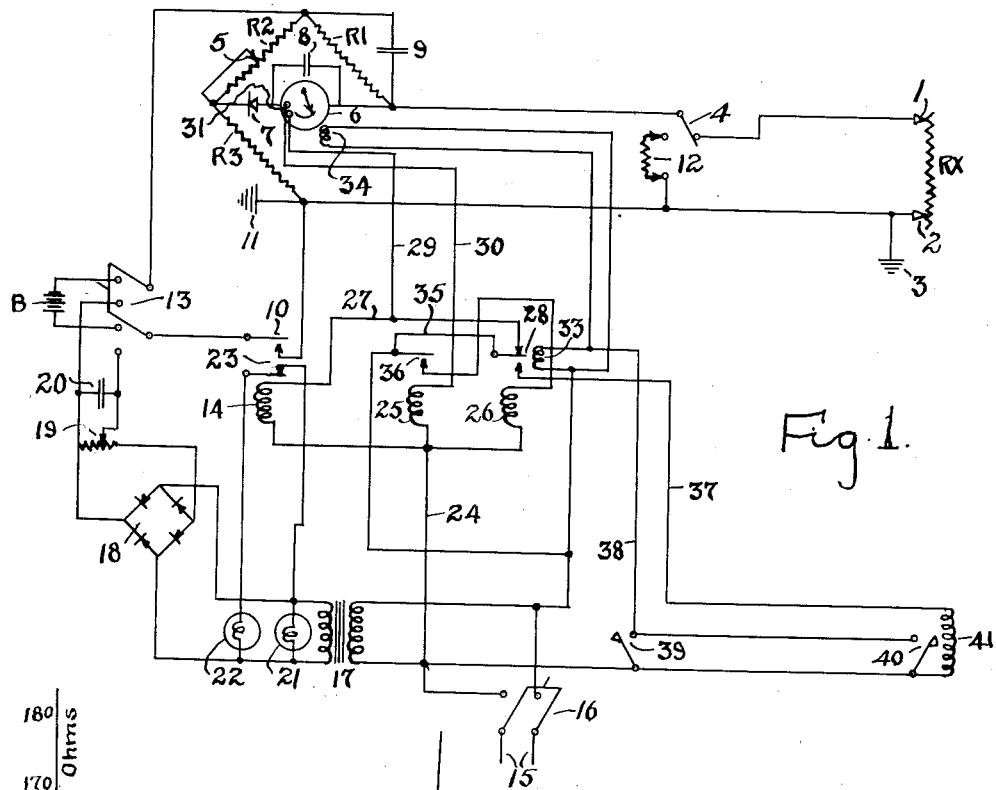
Figure 2:
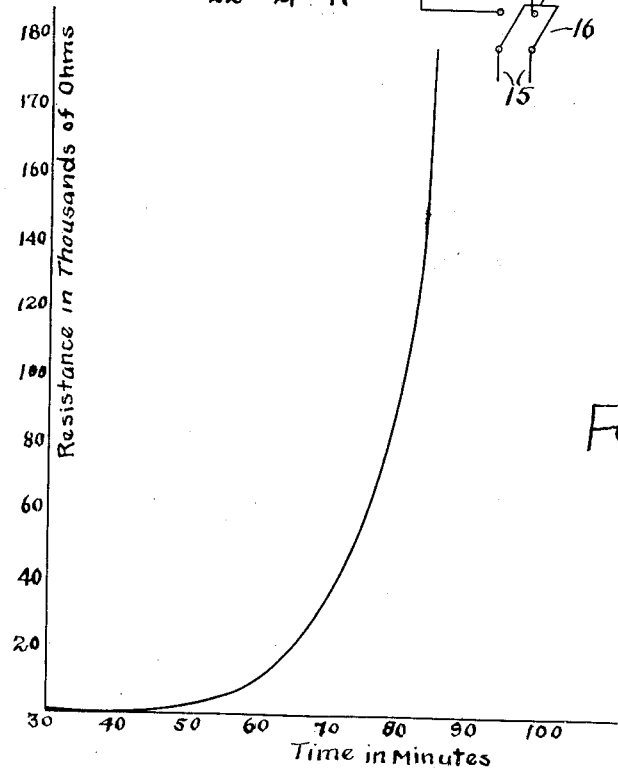

In the accompanying drawing,

Figure 1 is a diagrammatic and schematic illustration of the apparatus and interconnecting circuits comprising this invention; and Figure 2 is a curve indicating the relationship of batch resistance change with time.

A description of the apparatus without functional explanation will provide the best background for appreciating the advantages and functions thereof. As illustrated in Figure 1, the steam heated kettle is provided with a pair of electrodes 1 and 2. In actual practice the kettle itself may provide one of the electrodes which is indicated as the electrode 2 in the drawing. Electrode 1 will consist of a suitable conductive contact exposed to the contents of the kettle and insulated therefrom and will be assumed to be the electrode 1. The widely variable resistance of the contents of the kettle during processing is indicated diagrammatically by the resistance RX across these electrodes. The electrode 1 is preferably but not necessarily mounted in the bottom of the kettle so that it will lie under the power driven stirrer which agitates the contents of the kettle.

Electrode 1 is connected as shown to a fixed contact of the single-pole double-throw switch 4, the movable contact of which is connected to one terminal of the resistor R1. The other terminal of this resistor is connected to a resistor R2, which is provided with a movable contact 5 and connection by means of which that contact is connected to one terminal of the resistor R3. The other terminal of resistor R3 is connected to a conductor which is grounded at 3 and 11 and connects to the electrode (kettle) 2 and to one terminal of the single-pole single-throw switch 10 forming part of a relay of which the magnet 14 is the operator. Upon consideration it will be seen that the resistors RX, R1, R2 and R3 are connected in the usual Wheatstone bridge configuration. Connected across a pair of diagonal points of this bridge is a contact-making microammeter 6. In series in the ammeter connection is a rectifier 7 which, for example, may be germanium crystal type of rectifier so poled in the circuit as to pass current in only one direction. In this case with regard to Figure 1, from right to left. The meter is shunted by a rather large capacity condenser 8, which from experience has been determined in one case at least to be of the order of three thousand microfarads. Resistor R1 is shunted by a similar condenser 9.

At 12 is a test resistor of suitable value provided with plug terminals so that resistors of different values, depending upon operation conditions, can be placed in circuit. One terminal of this resistor is connected to the conductor which is grounded at 11. The other terminal is connected to the other fixed contact of switch 4. The common point of resistors R1 and R2 is connected to one of the movable contacts of the double-pole double-throw switch 13, the other movable contact of which is connected to the movable contact of switch 10. One pair of the fixed contacts of switch 13 are connected to a suitable current source, preferably the battery B, which may be composed of the ordinary dry cells of commerce.

At 15 are represented leads for connection to the usual 110 volt lighting circuit or other suitable power source. These leads, preferably fused, are connected to the terminals of a double-pole single-throw switch 16 of which the fixed contacts are connected across the primary of a transformer 17. The secondary of this transformer is connected to the input of a full wave rectifier 18 of any suitable form, as for example a vacuum tube rectifier or the simpler copper oxide type of rectifier. The output of the rectifier 18 is connected to the remaining pair of fixed contacts of switch 13. Potentiometer 19 is included in this circuit to adjust the voltage output of the rectifier when adjustment is desirable, and these leads are shunted by a filtering condenser 20 to filter out rectifier output fluctuations should they occur. The secondary of the transformer 17 is shunted by a signal light 21 which may be associated with a suitably colored lens. Another lamp 22 associated with a different colored lens has one terminal connected to the secondary of transformer 17 and the other terminal connected to the movable contact of a single-pole single-throw switch 23 forming part of the relay having the operating magnet 14. The fixed contact of switch 23 is connected to the other side of the secondary of transformer 17.

The circuit from one of the leads 15 is continued by means of the conductor 24 to one terminal of the magnet 14 to one terminal of magnet 25 of the relay, including the switch 36, and to one terminal of the magnet 26 forming part of still another relay having the single-pole double-throw switch 28. The other terminal of magnet 14 is connected by wire 27 to one of the fixed contacts of the switch 28. Wire 27 is connected by wire 29 to one of the contacts 31 forming part of the meter 6. The other contact of this switch is connected by wire 30 to the other terminal of magnet 25. The other terminal of magnet 26 is connected to the fixed contact of switch 36 and the movable contact of this switch is connected to one terminal of the magnet 33, the wire 35 and to the other power lead 15 through the switch 16. Wire 35 also connects the movable contact of switch 36 to the movable contact of switch 28.

The relay having the operating magnet 26 is of the type that latches the switch 28 closed when operated and magnet 33 is a part thereof for unlatching this relay when energized.

Magnet 33 is in parallel with the magnet 34 which forms part of the meter 6. At this point it may be noted that the meter is a standard commercial instrument and is of the type in which the indicating hand serves to complete the circuit when it interconnects the two contacts 31. These two contacts are magnets so that when the meter hand gets close enough thereto it is attracted by them and held in circuit closing position, that is interconnects the wires 29 and 30 until the releasing magnet 34 is energized. The other common terminal of magnets 33 and 34 are connected to a wire 38. This wire may be interconnected with one of the leads of the primary of transformer 17 by either of switch 39 or 40 which are the reset switches and will be referred to later. The other fixed contact of switch 28 is connected to a wire 37, which wire with one lead to the primary of transformer 17 provides a control circuit for any suitable form of signal and/or identically operated control device by means of which the operation of the process can be controlled. For example, the magnet 41 connected to this circuit may form part of a magnet valve or the like by means of which supply of steam to the kettle can be cut off when it is energized.

Referring to Figure 2 the curve therein is illustrative of the manner in which the resistance of a heat processed batch of animal parts changes as the processing thereof proceeds to completion and by means of which the valuable constituents are extracted, leaving the solid matter useful, for example as fertilizer. The animal parts in sufficient large quantity are placed in the same kettle and agitated by means of the stirrer as the batch is heated. At first the resistance of the batch is quite low, relatively speaking, and so, as indicated in the chart for the first thirty minutes processing continues without any interest on the part of the operator as to the condition thereof. At the end of thirty minutes, in a typical batch of such materials, the resistance continues to increase, at first slowly and then more rapidly, until the example illustrated attains the maximum value of about 175,000 ohms, which is the end point of the process. In other words, processing is complete.

This chart indicates that at the end of thirty minutes the resistance of the batch is zero, which is not strictly true. In relation to the apparatus illustrated and the circuit constants used it is zero in the sense that resistance RX is so low that a negative current tends to flow across the bridge diagonals which includes the meter 6. For example a negative current of a maximum value of 800 microamperes flows during this period. Meter needle movements representative of these values are relatively large in proportion to the needle movments during the period of processing after the first sixty minutes, and up until about 85 minutes, as shown in Figure 2, when processing is complete. As the operator is not interested in the change in resistance conditions at the beginning of the process and because of these wide variations in needle movement the system of this invention has been devised so that a center reading meter is not used, and the scale of the meter may be properly enlarged for accurate indication for the portion of the operation in which the operator is interested. For this reason the rectifier 7 is employed in the meter circuit to block the flow of negative current representing the output of the bridge during the greater part (all but the last few critical minutes) of processing. At the end of the first eighty minutes of processing the resistance RX has attained such a value that its relation to the resistance of the other arms of the bridge is such that a positive current begins to flow in the meter circuit, which current of course is not blocked by the rectifier 7. Thus the meter now begins to read.

Thus as processing continues the resistance of the batch gradually increases, first slowly and then rapidly, until, as stated in the example, it attains a value of 175,000 ohms.

During the latter part of this period of increasing resistance the meter needle progresses gradually over the scale until it interconnects the contacts 31.

A useful feature of this invention is that the balance point can be shifted over a wide range by changing the bridge arm proportions as by adjusting the resistance of the variable arm R2. The sensitiveness of the apparatus is enhanced by selecting the bridge constants so that the balanced bridge point comes near the desired end point resistance value for any particular process. Thus an instrument can be used which is sensitive for small unbalance in one direction in combination with a rectifier which blocks the heavy current of the large unbalance in the other direction. With such an arrangement, almost any desired degree of accuracy can be attained. Without this feature, it does not appear possible to even approach reasonable accuracy without employing much more complicated and complex measuring circuits.

With the system as disclosed, a negative voltage appears across the bridge until the resistance of the batch is about 100,000 ohms, about 50 minutes on the chart—actually about 80 minutes of processing. Near that point, the bridge is in balance and no current flows across the meter. Then during the last five minutes or so of processing, the meter starts to read the positive values. With this arrangement a more practical and easily readable scale can be provided for the meter.

With this introductory discussion reference will now be made to the circuit of Figure 1. It will be assumed that the parts are in the position shown. Switch 16 is closed whereupon lamp 21 is energized, illuminating the lens which is preferably green, indicating that the power circuit is energized. For preferred operation switch 13 is in the position to place the battery source B in circuit to energize the bridge circuit. Preferably switch 13 is of a type that cannot stay open. It is either closed on the battery B or the rectifier 18. When it is desired to operate the bridge circuit from the lighting circuit, switch 13 is thrown to its other contacts, whereupon the bridge circuit is fed by the rectifier 18 which is always energized when switch 16 is closed. Potentiometer 19 is provided to properly adjust the energizing potential, and condenser 20 smoothes the rectifier output. At this point it may be noted that for preferred operation energization of the bridge circuit from the power circuit is not as desirable as energization from the battery circuit B because of the possible effects of voltage and like fluctuations in the power circuit, and the effect of stray leakage currents. As the drain on the battery is practically negligible the life of the battery in use is substantially equal to its shelf life. Because of the characteristic steady voltage of a battery source it is by far the more suitable source. The alternative arrangement is provided for standby purposes. By using the battery the test circuit is isolated from the power circuit with all its inherent undesirable characteristics for such purposes. The power circuit, however, is of course provided to operate the various relays and control and signal devices.

When switch 16 was closed magnet 14 was energized through the wire 27 and the upper contact of switch 28, with the result that switch 10 was closed and switch 23 open. When the resistance of the batch reaches the end point the needle of the meter will interconnect wires 29 and 30 completing a circuit through wire 24, magnet 25, wire 30, wire 29 and the upper contact of switch 28, closing switch 36. The closing of switch 36 completes a circuit to wire 35 and switch 36 for magnet 26, which is energized to shift the movable contact of switch 28 from the position shown to its other fixed contact. This operates the switch 28, breaks the circuit from magnet 14, opening the battery circuit by switch 10 and closing the circuit for lamp 22 at switch 23. The lens associated with lamp 22 is preferably red giving a signal that the process is complete. The operation of switch 28 connects the wire 35 with wire 37 completing a circuit for the control device magnet 41 which, as stated, may operate a signal and/or interrupt the operation of the process as by shutting off the steam to the kettle.

Operation of switch 28 also opens the supply for magnet 25, so that switch 36 merely closes momentarily and then opens as soon as 28 opens.

It will be remembered that switch 28 remains latched in its operated position, that is when it interconnects wire 35 with wire 37. In order to reset the apparatus the operator operates either of the switches 39 and 40, several of which are provided for resetting from different suitable points. The closing of switch 39 or 40 completes a circuit in an obvious manner for the magnets 33 and 34. Energization of magnet 33 unlatches the associated relay so that the movable contact of switch 28 returns back to the position shown. Likewise, the energization of magnet 34 gives the movable disc of the meter 6 a kick to disengage the needle from the magnetic contacts 31, breaking the circuit for magnet 25. As previously mentioned, reverse operation of switch 28 also completes the circuit for magnet 14 so that switch 10 closes and switch 23 opens putting the bridge back in operation and extinguishing the light 22. The apparatus is now reset for the treatment of the next batch.

In order to provide a simple method of testing the bridge in its condition for correct operation switch 4 can be thrown in an obvious manner to substitute the calibrated resistance 12 for the resistance RX to show whether the system is properly operating for the predetermined end point of which the calibrated resistance 12 is representative.

A peculiarity of the operation of such a system is represented by the extremely wide variations in the resistance of the batch at different times during the complete processing cycle. By reason of the use of a stirrer the moist contents of the batch are whipped about the electrode 1 causing infinite variations in resistance. In order to prevent the needle of the meter 6 from rapidly jumping about in an effort to follow these variations the rather large capacitor 8 is provided which absorbs the sudden voltage changes represented by these resistance changes so that the meter is effectively dampened under these circumstances.

It is another characteristic of the system that as the process approaches the end point there are sudden relatively similar changes in resistance which occur no doubt due to the presence of pockets of more highly moist material than the remainder of the batch. In view of this fact the function of condenser 9 will be explained.

Without condenser 9, the voltage across the meter is more or less an average value, due to damping condenser 8. Thus, when the batch nears the value of say 150,000 ohms and the meter is within a few microamperes of closing the contacts 31, a single wet sample whipped across the electrodes for a short time will not materially change the average value, and will not noticeably change the position of the indicating needle.

With condenser 9 across R1, however, a single wet sample, by virtue of its low resistance will cause condenser 9 to be charged very quickly to almost the full voltage of the battery or supply (with zero resistance at RX, the battery is connected directly across condenser 9). Although the next several samples presented across the electrodes may be of average order, negative voltage will still appear across the meter-rectifier combination, and the needle will stay near zero, until the charge in condenser 9 has leaked off through R1 and other paths.

Thus a single wet sample causes the instrument to hesitate several seconds or more even though it be otherwise on the verge of tripping, until several more samples presented by the stirrers have proved to be of average order. If there are more wet pockets the tripping will be further delayed, but a single wet sample will simply cause a sort of reconsideration period of a few seconds or so, depending on choice of condenser 9 and other constants.

Condenser 9 provides a disproportionate holding back by wet pockets when the average resistance is near the finish point. The instrument "thinks twice" before tripping when there are wet spots present in a high average mix. Thus the capacitor 9 tends to prevent a premature closing of the circuit at the contacts 31 due to the peculiar condition encountered as explained above.

In addition to the simplicity and effectiveness of this system it is pointed out that it can be made quite accurate and indeed much more accurate than normal operating conditions require. Installation indicates that it may be considered to be accurate within 10% of the preset end point resistance value, a somewhat greater accuracy than is now required. Still greater accuracies can be obtained by proper choice of circuit constants, if desired.

The apparatus is extremely reliable consisting of simple, ordinary commercial parts which are adapted to long life without deterioration and without requiring expensive maintenance. The apparatus is small in bulk, and inexpensive to reproduce.

Another feature of the system is its adaptability to a wide end point range. In the illustrative example given the system was devised to be most effective for an end point resistance value of 175,000 ohms, as previously mentioned. However, with slight readjustment it is possible to easily vary this end point range between 100,000 and 350,000 ohms and other ranges can be supplied with limits anywhere from practically zero to several million ohms by employing suitable circuit constants.

The system is simple to operate, requiring only the closing of the switch 16. It is easily tested by the simple operation of switch 4 and is quickly reset by the operation of switch 39 or switch 40. The test switch 4 and the reset switches 39 and 40 may be of the type which return to normal position upon release, requiring no special consideration for maintenance of proper working position.

To be clear on the point, it will now be readily appreciated that this apparatus is not limited to use with the particular process recited by way of example. It can be used with any heat processing operation where the material being processed is subject to resistance changes which are representative of its progress in the process cycle. The particular example selected has the virtue of representing one of the more difficult types of processes to which the apparatus may be adapted because of the extremely violent and wide fluctuations in resistance which occur during the processing cycle.

I do not therefore desire to be strictly limited to the disclosure as herein given and especially to the details of arrangement and combination of parts illustrated as the subject matter of this invention is capable of variation within the skill of those in the art in the light of this disclosure. I prefer, therefore, to be limited only by the claims as granted me.

What is claimed is:

1. In a system of the type described, the combination comprising a resistance Wheatstone bridge, one arm of which is composed of the resistance of a process batch, said bridge being adjusted to balance at a particular value of the resistance of the batch, a direct current source for energizing said bridge, and an indicating meter connected across said bridge in series with means for limiting the flow of current through said meter in the direction of unbalance only whereby said meter indicates when the resistance of the batch exceeds a value which balances said bridge.

2. In the combination of claim 1, means for damping said meter comprising a capacitator shunted thereacross, and a capacitor shunted across the arm of the bridge in series with said batch and said current source.

3. In the combination of claim 1, said means comprising a rectifier.

4. In the combination of claim 1, said meter being a contact-making meter and means in circuit with the contact of said meter for operating a control device for the batch upon the attainment of said particular value of the resistance of the batch.

5. In the combination of claim 1, said meter being a contact-making meter, a damping capacitor shunted across said meter, a capacitor shunted across one of the resistors of said bridge, and a control device in circuit with the contact of said meter and actuated upon the attainment of a predetermined resistance in the batch.

GEORGE TOMPKINS.

REFERENCES CITED

The following references are of record in the file of this patent:

UNITED STATES PATENTS

| Number | Name | Date |
|---|---|---|
| 1,450,023 | Edelman | Mar. 27, 1923 |
| 1,951,149 | Hatay | Mar. 13, 1934 |
| 1,985,095 | Hoare | Dec. 18, 1934 |
| 2,068,499 | Mackenzie | Jan. 19, 1937 |
| 2,270,732 | Jones | Jan. 20, 1942 |
| 2,370,609 | Wilson et al. | Feb. 27, 1945 |
| 2,432,390 | Darby | Dec. 9, 1947 |

FOREIGN PATENTS

| Number | Country | Date |
|---|---|---|
| 308,580 | Great Britain | Jan. 9, 1930 |
| 332,240 | Great Britain | July 15, 1930 |